No. 776,255. PATENTED NOV. 29, 1904.
M. W. PANGBURN.
COMBINED SAW GUMMING AND SHARPENING MACHINE.
APPLICATION FILED JAN. 25, 1904.
NO MODEL.
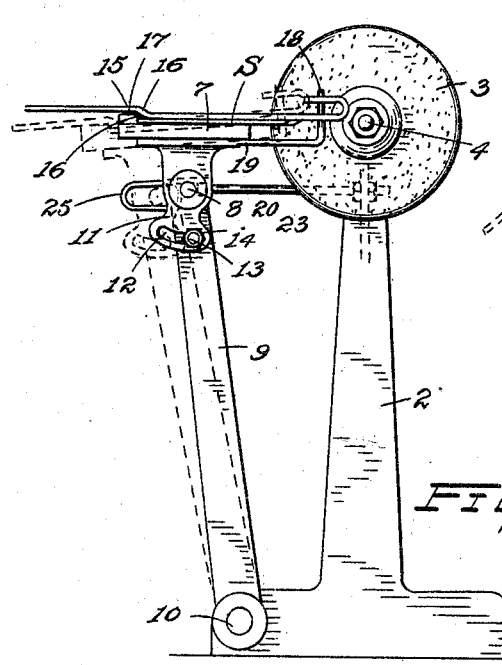
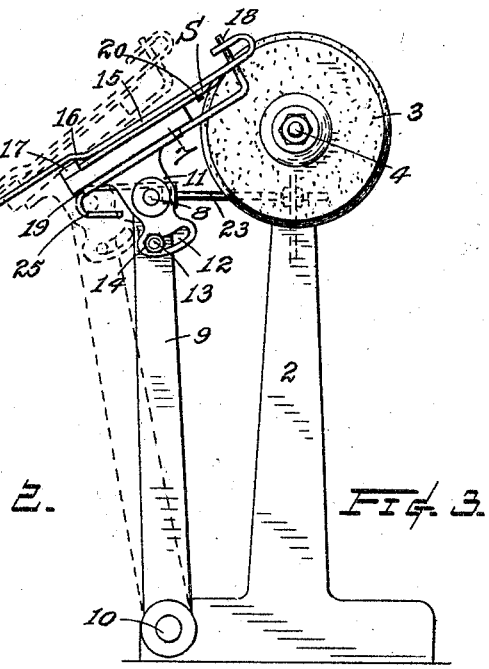
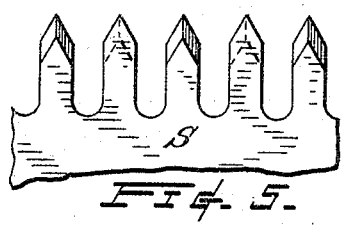
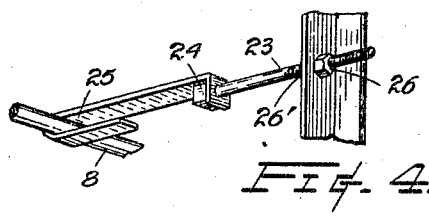
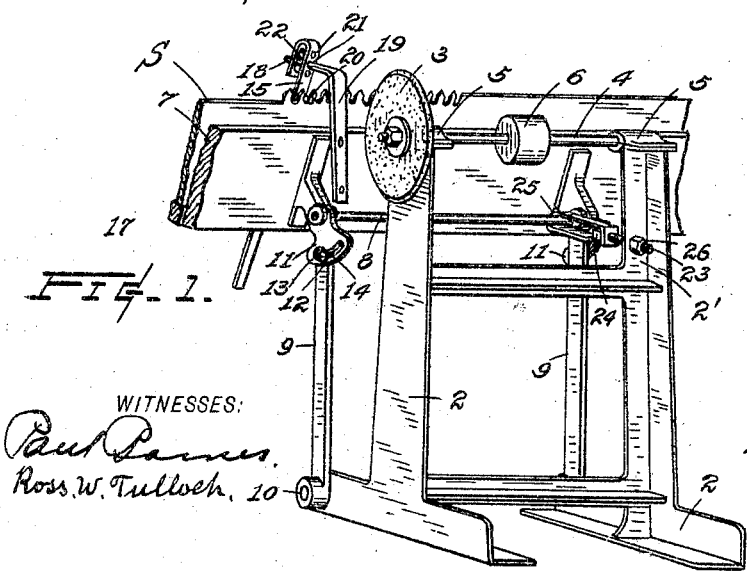
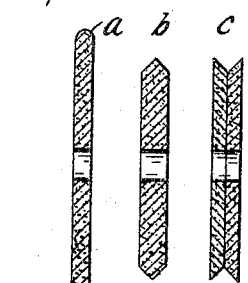
WITNESSES:
Paul Barnes
Ross W. Tulloch
INVENTOR
M. W. Pangburn.
BY
Pierre Barnes
ATTORNEY No. 776,255.

Patented November 29, 1904.

UNITED STATES PATENT OFFICE.

MARTIN W. PANGBURN, OF BALLARD, WASHINGTON.

COMBINED SAW GUMMING AND SHARPENING MACHINE.

SPECIFICATION forming part of Letters Patent No. 776,255, dated November 29, 1904.

Application filed January 25, 1904. Serial No. 190,464. (No model.)

*To all whom it may concern:*

Be it known that I, MARTIN W. PANGBURN, a citizen of the United States, residing at Ballard, in the county of King and State of Washington, have invented certain new and useful Improvements in a Combined Saw Gumming and Sharpening Machine, of which the following is a specification, reference being had therein to the accompanying drawings.

My invention relates to improvements in saw grinders and sharpeners, and refers more especially to that class of machines in which a crosscut or drag saw may be both sharpened and the interdental spaces formed.

It is the object of my invention, among other things, to construct a machine of this general character in which the grinding may be accomplished with accuracy and despatch.

It is a further object of my invention to construct the machine with the fewest possible parts, so designed as to be economically constructed and readily assembled.

To these and other ends my invention consists in a combined saw gummer and sharpener having certain novel details of construction and combination of parts, as will be hereinafter described, and more particularly pointed out in the claims.

Referring to the drawings, in which like characters denote like parts in the several views, Figure 1 is a perspective view of a machine embodying my invention. Fig. 2 is an end elevation of the same, showing the table arranged for grinding the spaces between the saw-teeth and, further, showing by full and broken lines, respectively, the swinging parts in operative and inoperative position. Fig. 3 is a view similar to Fig. 2, except that the parts are arranged for sharpening or fleaming the saw-teeth. Fig. 4 is a detail perspective view of the adjustable means for regulating the travel of the saw-table. Fig. 5 is a fragmentary plan view of a drag-saw blade; Fig. 6, cross-sectional views of various forms of emery-wheels particularly adapted for use with the invention.

The reference-numeral 2 designates a suitable frame for the machine; 3, an emery-wheel mounted upon a horizontal arbor 4, which is journaled in boxes 5 of the frame. 6 is a pulley mounted upon the said arbor and positioned in line with and connected by a belt to a driving-pulley.

7 is a table for a saw S, extending longitudinally of the frame, and is pivotally supported, as by a rod 8, upon vibratory upright arms 9. At their lower ends these arms are hinged or pivotally connected, as by a rod 10, to the framework, so that the table can be swung toward or from the said arbor. The said table is connected to the rod 8 by sector-plates 11 and which are each provided with a concentric slot 12, through which protrude the ends of screw-threaded bolts 13, integrally connected at their other ends to the said arms. By this construction the table may be tilted independently of the supporting-arms and secured in a number of set positions by means of nuts 14 provided.

15 is a lever having intermediate reverse bends 16 in order that the inner portion thereof will rest upon the saw-blade, while the outer or handle end will extend over a stop 17, provided along the rear edge of the table. The lever is fulcrumed adjacent its inner end to a rectangular projecting pin 18 of a bracket-arm 19, secured to the table. Extending downwardly from the said lever and intermediate its length is a stud 20, adapted to engage the saw within the tooth-gullets, so that the saw may thereby be moved along upon the table as the work progresses by swinging the handle end of the said lever. An advantageous construction of the fulcrum end of the lever is to bend or fold the same backward, as shown, and provide in the lower part thereof a series of apertures 21, so that the fulcrum-point may be changed and have the stud 20 engage, as aforementioned, with saws of various widths. The upper part or fold is provided with a slot 22 to allow the lever being tilted up to move the stud 20 from engagement with one gullet to another.

Provision is made for limiting the swing of the table in its inner and outward movements (see Fig. 4) by means of a screw-bolt 23, having its head-end 24 located in the arc of travel of the rod 8, and a hook extension 25, projecting beyond and adapted to engage this rod at the end of its outer travel. The bolt 23 passes through one of the standards 2' of the frame and is adjustably secured thereto by screw-nuts 26 and 26'. By the construction and arrangement of the aforedescribed sector-plates and the manner of connecting them to the table and the vibratory-arms the table is capable of being secured either in an approximately horizontal plane, as in Fig. 2, for the purpose of grinding the saw-gullets or "gumming," as it is known in the art, and in an inclined plane, as in Fig. 3, for pointing or sharpening the saw-teeth. The saw for either of these operations is moved into or out of action with the rotating emery-wheel by swinging the table correspondingly, and the saw is successively advanced to present a new gullet or tooth, as the case may be, when the table is retracted by manipulating the lever as hereinbefore described.

In Fig. 6 is shown a number of forms of emery-wheels especially adapted for use with the invention and wherein the peripheries are severally shaped for the particular service intended. For example, the one with convex circumference $a$ is for grinding the rectangular edges and the semicircular bottoms of the gullets and the angular-shaped ones $b$ and $c$ for sharpening the teeth. It may be mentioned that in practice I have obtained the last-named wheel by using two disk-wheels, each having a single inclined periphery and mounting them on the arbor so that such inclined surfaces will face each other.

Having described my invention, what I claim as new, and desire to secure by Letters Patent, is—

1. In a machine of the class described, the combination with a suitable frame and an emery-wheel mounted on an arbor journaled therein, of vibratory supporting-arms hinged at their lower ends to the said frame, a saw-supporting table hinged to the upper ends of said arms, the means to secure the said table at different angles of inclination relatively of and to the said arms, and the means to limit the amount of swing of the table, substantially as and for the purposes herein set forth.

2. In a machine of the class described, the combination with a suitable frame and an emery-wheel mounted on an arbor journaled therein, of vibratory supporting-arms hinged at their lower ends to the said frame, a saw-supporting table hinged to the upper ends of said arms, and the means to secure said table at different angles of inclination relatively of and to said arms, substantially as and for the purposes herein set forth.

In testimony whereof I affix my signature in presence of two witnesses.

MARTIN W. PANGBURN.

Witnesses:
 PIERRE BARNES,
 M. E. BREWER.